(12) United States Patent
Dinu et al.

(10) Patent No.: US 10,871,879 B2
(45) Date of Patent: Dec. 22, 2020

(54) SYSTEMS AND METHODS FOR PROVIDING FEED PAGE UPDATES IN A SOCIAL NETWORKING SYSTEM

(71) Applicant: Facebook, Inc., Menlo Park, CA (US)

(72) Inventors: Daniel Dinu, Sunnyvale, CA (US); Lingjuan Peng, Menlo Park, CA (US); Niting Qi, Union City, CA (US); Ashish Kumar Yadav, Mountain View, CA (US); Neal Suresh Vora, San Jose, CA (US); Andre Nader, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 676 days.

(21) Appl. No.: 15/283,025

(22) Filed: Sep. 30, 2016

(65) Prior Publication Data

US 2018/0096251 A1    Apr. 5, 2018

(51) Int. Cl.
*G06F 3/0482* (2013.01)
*G06Q 50/00* (2012.01)
*G06N 20/00* (2019.01)

(52) U.S. Cl.
CPC .......... *G06F 3/0482* (2013.01); *G06Q 50/01* (2013.01); *G06N 20/00* (2019.01)

(58) Field of Classification Search
CPC ... G06F 3/0482; G06F 16/9535; G06N 20/00; G06N 3/08; G06Q 50/01
See application file for complete search history.

(56) References Cited

U.S. PATENT DOCUMENTS

| | | | | |
|---|---|---|---|---|
| 8,230,361 B2* | 7/2012 | Goldberg | ............ | G06F 3/0482 715/815 |
| 9,118,723 B1* | 8/2015 | Su | ............ | H04L 67/22 |
| 2006/0271834 A1* | 11/2006 | Wang | ............ | G06F 16/958 715/236 |
| 2012/0166532 A1* | 6/2012 | Juan | ............ | G06Q 30/0224 709/204 |
| 2014/0297739 A1* | 10/2014 | Stein | ............ | H04L 67/22 709/204 |
| 2015/0006280 A1* | 1/2015 | Ruiz | ............ | G06Q 30/00 705/14.45 |
| 2015/0046528 A1* | 2/2015 | Piepgrass | ............ | G06F 15/17306 709/204 |
| 2016/0286002 A1* | 9/2016 | Marra | ............ | H04L 51/32 |

* cited by examiner

*Primary Examiner* — Li Wu Chang
(74) *Attorney, Agent, or Firm* — Sheppard Mullin Richter & Hampton LLP

(57) ABSTRACT

Systems, methods, and non-transitory computer readable media can determine one or more user-related metrics relating to each page of a plurality of pages associated with an administrator based on a first machine learning model. One or more recommendations relating to each page of the plurality of pages can be determined based on a second machine learning model. One or more pages of the plurality of pages for which to display cards including page updates in a feed of the administrator can be determined, based on the determined user-related metrics and the determined recommendations.

20 Claims, 11 Drawing Sheets

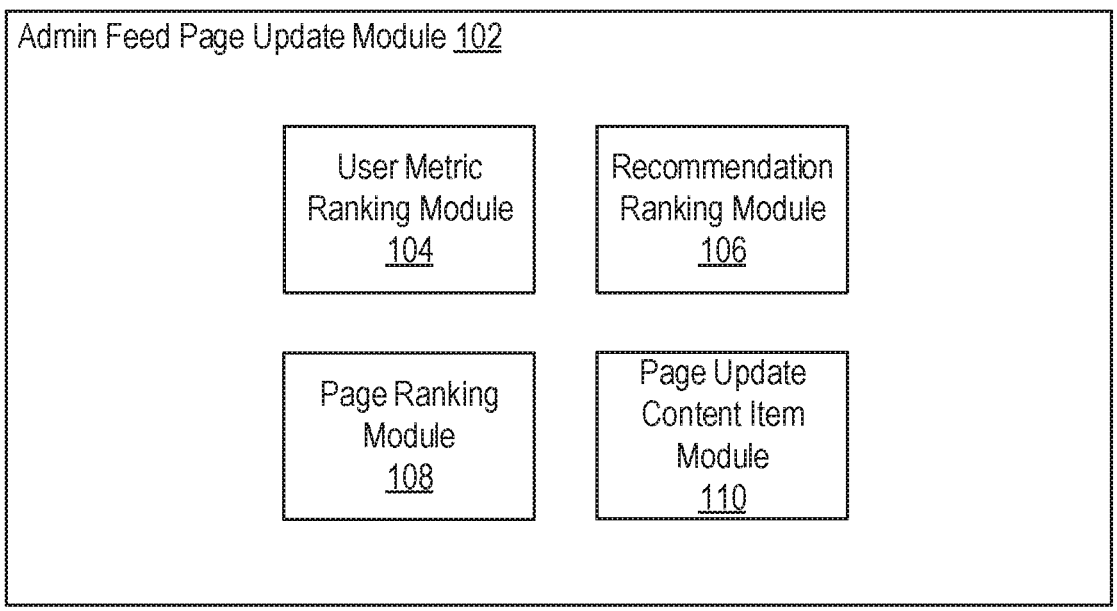
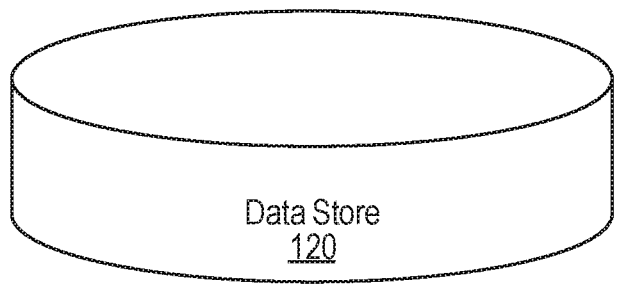
FIGURE 1

400

```
┌─────────────────────────────────────────────────────────────────┐
│  Determine one or more user-related metrics relating to each    │
│  page of a plurality of pages associated with an administrator  │
│  based on a first machine learning model                        │
│                              402                                │
└─────────────────────────────────────────────────────────────────┘
                                 │
                                 ▼
┌─────────────────────────────────────────────────────────────────┐
│  Determine one or more recommendations relating to each page    │
│  of the plurality of pages based on a second machine learning   │
│  model                                                          │
│                              404                                │
└─────────────────────────────────────────────────────────────────┘
                                 │
                                 ▼
┌─────────────────────────────────────────────────────────────────┐
│  Determine one or more pages of the plurality of pages for      │
│  which to display cards including page updates in a feed of     │
│  the administrator, based on the determined user-related        │
│  metrics and the determined recommendations                     │
│                              406                                │
└─────────────────────────────────────────────────────────────────┘
```

FIGURE 4

SYSTEMS AND METHODS FOR PROVIDING FEED PAGE UPDATES IN A SOCIAL NETWORKING SYSTEM

FIELD OF THE INVENTION

The present technology relates to the field of social networks. More particularly, the present technology relates to techniques for providing page information in social networking systems.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system.

A social networking system may provide user profiles for various users through which users may add connections, such as friends, or publish content items. In one example, a user (or entity) of the social networking system can post a content item, which can be presented on a profile page of the user. In another example, the content item can be presented through a feed, such as a newsfeed, for the user or for another user to view and access.

SUMMARY

Various embodiments of the present disclosure can include systems, methods, and non-transitory computer readable media configured to determine one or more user-related metrics relating to each page of a plurality of pages associated with an administrator based on a first machine learning model. One or more recommendations relating to each page of the plurality of pages can be determined based on a second machine learning model. One or more pages of the plurality of pages for which to display cards including page updates in a feed of the administrator can be determined, based on the determined user-related metrics and the determined recommendations.

In some embodiments, the cards for the one or more pages are displayed in a content item in the feed of the administrator.

In certain embodiments, a card for a page of the one or more pages is displayed as a card in the content item.

In an embodiment, the card for the page displays one or more of: page information relating to the page, user-related metrics relating to the page, or recommendations relating to the page.

In some embodiments, feedback associated with one or more of: the displayed cards for pages, the displayed user-related metrics, or the displayed recommendations is obtained.

In certain embodiments, the content item includes a card that provides a list including at least one page not included in the one or more pages and a number of unread items associated with the at least one page.

In an embodiment, the first machine learning model is trained based on training data indicating user-related metrics selected by a plurality of administrators.

In some embodiments, the second machine learning model is trained based on training data indicating recommendations selected by a plurality of administrators.

In certain embodiments, the determining one or more pages of the plurality of pages for which to display cards including page updates in a feed of the administrator is based on a third machine learning model.

In an embodiment, the third machine learning model is trained based on training data indicating pages selected by a plurality of administrators.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 1 illustrates a system including an example admin feed page update module configured to provide page updates in feeds of administrators, according to an embodiment of the present disclosure.

FIG. 4 illustrates an example first method for providing page updates in feeds of administrators, according to an embodiment of the present disclosure.

Figure 2A:
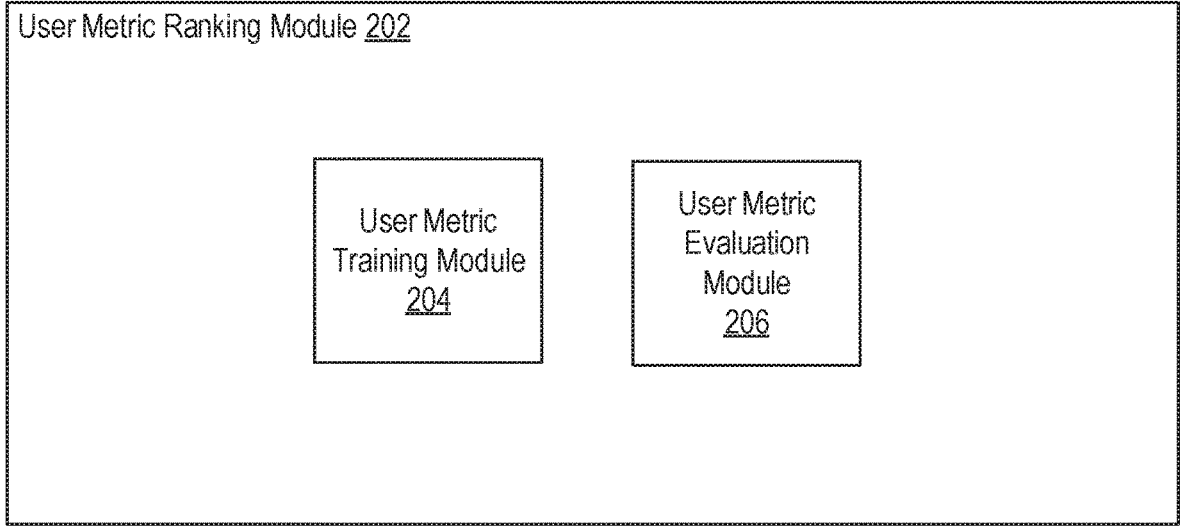
FIG. 2A illustrates an example user metric ranking module configured to rank user-related metrics or updates, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Providing Feed Page Updates in a Social Networking System

People use computing devices (or systems) for a wide variety of purposes. Computing devices can provide different kinds of functionality. Users can utilize their computing devices to produce information, access information, and share information. In some cases, users can utilize computing devices to interact or engage with a conventional social networking system (e.g., a social networking service, a social network, etc.). A social networking system may provide user profiles for various users through which users may add connections, such as friends, or publish content items. In one example, a user (or entity) of the social networking system can post a content item, which can be presented on a profile page of the user. In another example, the content item can be presented through a feed, such as a newsfeed, for the user or for another user to view and access.

The social networking system may provide pages for various entities. For example, pages may be associated with companies, businesses, brands, products, artists, public figures, entertainment, individuals, and other types of entities. The pages can be dedicated locations on the social networking system to reflect the presence of the entities on the social networking system. The pages can publish content that is deemed relevant to the associated entities to promote interaction with the pages. Interaction with the pages can involve users visiting pages, accessing content published by the pages, sending messages to the pages, commenting on content on the pages, etc. Page administrators can manage the pages, review information associated with the pages, and take any necessary actions to maintain and enhance user interaction with the pages.

Conventional approaches specifically arising in the realm of computer technology can provide information and updates relating to a page to a page administrator through the page itself. For example, the page administrator may need to navigate to and access the page to review the information or updates relating to the page. The information and updates relating to the page can include information relating to messages sent to the page, comments provided on the page, and the like. The information and updates relating to the page can prompt the page administrator to take responsive action on the page to improve the quality of the page. However, a page administrator may not access a page frequently. As a result, the page administrator may not access the information and updates relating to the page in a timely manner. The failure of the page administrator to timely access the information and updates relating to the page can delay or preclude responsive action by the page administrator. In these circumstances, the quality of the page can be compromised.

An improved approach rooted in computer technology can overcome the foregoing and other disadvantages associated with conventional approaches specifically arising in the realm of computer technology. Based on computer technology, the disclosed technology can provide updates relating to a page in a feed associated with a related page administrator. The page can be supported by a social networking system. As a user of the social networking system, the page administrator can have a dedicated feed. Updates relating to one or more pages managed by the page administrator can be included in a content item in the feed for the page administrator. Updates relating to one or more pages managed by a page administrator can be referred to as "page updates." Page updates can include any type of information relating to pages that can be helpful to page administrators. Examples of page updates can include information relating to new messages, new comments, etc. A content item that includes page updates can be displayed in a page administrator's feed. The content item can represent a page associated with a page update as a card. A card for a page can include presence information about the page, one or more user-related metrics or updates for the page, and one or more recommendations or tips for the page. In some embodiments, a sequence of cards for pages can be displayed horizontally within the content item, and the page administrator can review the cards in the content item by scrolling from left to right.

Information included in page updates can be determined to optimize a likelihood of a page administrator engaging with selected information. For example, pages, user-related metrics, and recommendations can be selected for inclusion in the content item such that a page administrator is likely to engage with selected pages, user-related metrics, and recommendations. User-related metrics can be ranked based on a machine learning model. Recommendations can also be ranked based on a machine learning model. Pages can be ranked based on the ranked user-related metrics and the ranked recommendations. Pages can be ranked based on a machine learning model. Machine learning models can be trained on training data that indicates pages, user-related metrics, and resources with which page administrators have engaged. Feedback can be obtained from a page administrator regarding whether the page administrator prefers to see more or less of certain types of information included in the content item. The feedback can be used to train or retrain the machine learning models.

In this way, the disclosed technology can provide page updates in a manner that facilitates review by a page administrator. A page administrator can easily access and check the page administrator's feed. The page administrator's feed can act as an information source through which the page administrator can access content items relevant to the page administrator. Instead of navigating to and accessing a particular page, the page administrator can see page updates for one or more pages associated with the page administrator as a content item in the page administrator's feed along with other content items. In addition, the page administrator can see information about multiple pages in the same content item. Because information included in the content item can be selected to increase a likelihood of engagement by the page administrator, the information is likely to be helpful to the page administrator in optimizing page quality.

FIG. 1 illustrates an example system 100 including an example admin feed page update module 102 configured to provide page updates in feeds of administrators, according to an embodiment of the present disclosure. The admin feed page update module 102 can include a user metric ranking module 104, a recommendation ranking module 106, a page ranking module 108, and a page update content item module 110. In some instances, the example system 100 can include at least one data store 120. The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the admin feed page update module 102 can be implemented in any suitable combinations.

As mentioned above, a content item that includes page updates can include presence information, one or more user-related metrics, and one or more recommendations for a page. A content item in a page administrator's feed that includes page updates can be referred to as a "page update content item." Presence information can provide basic information relating to a page, such as a name of a page, a category of a page, etc. Presence information can also include unread counts associated with a page and page-related events. Unread counts can indicate unread counts associated with messages, comments, reviews, notifications, etc. A user-related metric can indicate a metric relating to users that is associated with a page. A recommendation can indicate a recommendation or tip for a page that can be provided to a page administrator. An amount of space to display the content item in the page administrator's feed may be limited. Accordingly, the number of pages addressed by or represented in a content item can be limited. Similarly, the number of user-related metrics and the number of recommendations that can be displayed in a card for a page can be limited. For example, maximum values can be set for the number of pages that can be addressed in the content item, the number of user-related metrics that can be displayed in a card for a page, and the number of recommendations that can be displayed in a card for a page. Since not all pages can be addressed in the content item, pages can be ranked, and top ranked pages can be candidates for addressing in the content item. Pages can be ranked based on which user-related metrics and recommendations are selected for the pages, as explained in more detail below. Similarly, since not all user-related metrics and recommendations for a page can be displayed in a card for a page, user-related metrics and recommendations can be ranked, and top ranked user-related metrics and top ranked recommendations can be candidates for display in a card for a page. Candidate user-related metrics and recommendations can be displayed in a card for a page if the page is selected to be addressed in the content item. Presence information, user-related metrics, and recommendations are provided as examples of information that can be included in a card for a page for illustrative purposes, and any other type of information about pages can be ranked, selected, and/or included in a card for a page.

The user metric ranking module 104 can rank one or more user-related metrics associated with a page. Examples of user-related metrics can include likes, likes by connections, comments, messages, posts, shares, reviews, mentions, reach, call to action (CTA) selections (e.g., clicks), check ins, etc. The user metric ranking module 104 can rank user-related metrics associated with a page based on machine learning techniques and select top ranked metrics as candidates to include in a card for the page. The user metric ranking module 104 is described in more detail herein.

The recommendation ranking module 106 can rank one or more recommendations associated with a page. The recommendation ranking module 106 can rank recommendations associated with a page based on machine learning techniques and select top ranked recommendations as candidates to include in a card for the page. The recommendation ranking module 106 is described in more detail herein.

The page ranking module 108 can rank one or more pages associated with a page administrator. A page administrator can manage one or more pages, and the page ranking module 108 can rank the one or more pages managed by the page administrator based on machine learning techniques and select top ranked pages as candidates to address in a page update content item. The page ranking module 108 can rank the one or more pages based on which user-related metrics and which recommendations are selected as candidates to be included for each page, for example, by the user metric ranking module 104 and the recommendation ranking module 106. The page ranking module 108 is described in more detail herein.

The page update content item module 110 can generate a content item that includes page updates for one or more pages. The page update content item module 110 can generate a page update content item for a page administrator based on rankings performed by the user metric ranking module 104, the recommendation ranking module 106, and the page ranking module 108. In some cases, even if pages associated with a page administrator have been ranked, ranked pages may not be shown to the page administrator. For example, it can be unlikely that the page administrator will engage with pages that are candidates to address in a page update content item. In such case, a page update content item for candidate pages may not be included in the page administrator's feed. Accordingly, the page update content item module 110 can generate a page update content item for candidate pages if the candidate pages satisfy a minimum threshold for probability of engagement by the page administrator. In some embodiments, information reflected in a page update content item can be associated with a particular time period. For example, a page update content item in a feed of a page administrator can be designed to provide recent or timely information. In one instance, a page update content item can provide user-related metrics for a selected previous period of time, such as a previous one week period.

The page update content item module 110 can create a card for each page that is to be included in a page update content item for a page administrator's feed. The card for each page can include a section for presence information for the page, a section for user-related metrics for the page, and a section for recommendations for the page. The section for user-related metrics can include one or more slots or positions for user-related metrics. The number of slots in the section for user-related metrics can be capped at a selected maximum number of slots. The slots can be positioned in a vertical sequence. Selected user-related metrics can appear in a ranked order in the slots for user-related metrics. For example, higher ranked user-related metrics can appear towards the top slots, and lower ranked user-related metrics can appear towards the bottom slots. The section for recommendations can include one or more slots or positions for recommendations. The number of slots in the section for recommendations can be capped at a selected maximum number of slots. Selected recommendations can appear in a ranked order in the slots for recommendations. For example, higher ranked recommendations can appear towards the top slots, and lower ranked recommendations can appear towards the bottom slots. The page update content item generated by the page update content item module 110 can be displayed in the feed of the page administrator. Cards for pages can also appear in a ranked order in the content item. For example, higher ranked pages can appear towards the left side of the content item, and lower ranked pages can appear towards the right side of the content item.

In some cases, a page managed by a page administrator may not be selected to be addressed in a page update content item as a card. For example, the page may not be among top ranked pages. However, the page can have information that the page administrator may want to be aware of, such as unread counts associated with messages, comments, reviews, notifications, etc. Accordingly, the page update content item module 110 can create a card for the page update content item that provides a summary of information that the page administrator may want to know about pages that are not selected to be addressed in the page update content item. For example, the page update content item module 110 can create a card that includes a list of one or more unselected pages and unread counts for the unselected pages. In this way, the page administrator can be aware of certain updates about unselected pages.

The page update content item module 110 can track pages, user-related metrics, and recommendations displayed in page update content items with which page administrators engage. For example, a page administrator can engage or interact with various parts of a page update content item by selecting such parts through, for example, a touch gesture or a click. Tracked information can include what was selected and also what part was selected if relevant. For example, for a page, tracked information can indicate whether a card for a page was selected, regardless which part of the card was selected. On the other hand, for a user-related metric, which part of the section for user-related metrics was selected can indicate with which user-related metric a page administrator engaged. Accordingly, for a user-related metric, tracked information can indicate that the section for user-related metrics was selected and also indicate which slot was selected. Similarly, for a recommendation, which part of the section for recommendations was selected can indicate with which recommendation a page administrator engaged. Accordingly, for a recommendation, tracked information can indicate that the section for recommendation was selected and also indicate which slot was selected. Tracked information can be included in training data and used to train machine learning models for ranking pages, user-related metrics, and recommendations, as explained below.

A page administrator can provide feedback relating to a page update content item included in the page administrator's feed. For example, the page administrator can indicate whether the page administrator wants to see more or less of certain information in the page update content item. The feedback can be provided for each page or for the entire page update content item. For example, the page administrator can indicate whether the page administrator wants to see more or less of page update content items. The page administrator can also indicate whether the page administrator wants to see more or less of cards like a card for a page in the page update content item. Feedback by page administrators can be used to train machine learning models for ranking pages, user-related metrics, and recommendations, as explained below.

In some embodiments, the admin feed page update module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the admin feed page update module 102 can be, in part or in whole, implemented as software running on one or more computing devices or systems, such as on a server system or a client computing device. In some instances, the admin feed page update module 102 can be, in part or in whole, implemented within or configured to operate in conjunction or be integrated with a social networking system (or service), such as a social networking system 630 of FIG. 6. Likewise, in some instances, the admin feed page update module 102 can be, in part or in whole, implemented within or configured to operate in conjunction or be integrated with a client computing device, such as the user device 610 of FIG. 6. For example, the admin feed page update module 102 can be implemented as or within a dedicated application (e.g., app), a program, or an applet running on a user computing device or client computing system. It should be understood that many variations are possible.

The data store 120 can be configured to store and maintain various types of data, such as the data relating to support of and operation of the admin feed page update module 102. The data maintained by the data store 120 can include, for example, information relating to feeds, pages, user-related metrics, recommendations, ranking of pages, ranking of user-related metrics, ranking of recommendations, machine learning models, page update content items, cards, engagement data associated with pages, engagement data associated with user-related metrics, engagement data associated with recommendations, etc. The data store 120 also can maintain other information associated with a social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. As shown in the example system 100, the admin feed page update module 102 can be configured to communicate and/or operate with the data store 120. In some embodiments, the data store 120 can be a data store within a client computing device. In some embodiments, the data store 120 can be a data store of a server system in communication with the client computing device.

FIG. 2A illustrates an example user metric ranking module 202 configured to rank user-related metrics or updates, according to an embodiment of the present disclosure. In some embodiments, the user metric ranking module 104 of FIG. 1 can be implemented with the user metric ranking module 202. As shown in the example of FIG. 2A, the user metric ranking module 202 can include a user metric training module 204 and a user metric evaluation module 206.

The user metric ranking module 202 can rank user-related metrics for a page according to a likelihood or probability of page administrators engaging with the user-related metrics. For example, a page administrator can engage with a user-related metric by selecting the user-related metric when it appears in a card in a page update content item. A page administrator can engage with a user-related metric in different ways, and many variations are possible. As mentioned above, examples of user-related metrics can include likes, likes by connections, comments, messages, posts, shares, reviews, mentions, reach, call to action (CTA) selections (e.g., clicks), etc. Likes can indicate a total number of likes for a page by users. Likes by connections can indicate a number of likes for a page by users who are connections of a page administrator. Comments can indicate a number of comments submitted to a page by users. Messages can indicate a number of messages submitted to a page by users. Posts can indicate a number posts submitted to a page by users. Reviews can indicate a number of reviews submitted to a page by users. Mentions can indicate a number of references to a page by public figures or other notable users. Reach can indicate a number of users reached by a post of page. Call to action selections can indicate a number of selections of a call to action, such as a call to action button. There can be other types of user-related metrics, and many variations are possible. The user-related metrics can be ranked based on a machine learning model.

The user metric training module 204 can train a machine learning model based on training data relating to user-related metrics. Training data can indicate user-related metrics that page administrators have engaged with and slots within a card in which the user-related metrics were displayed. User-related metrics that page administrators have engaged with in cards can be tracked, as explained above. Tracked information about user-related metrics that page administrators have engaged with can be included in the training data. Various features can be used in training the machine learning model. Features can include features associated with a page administrator, features associated with a page, or any other features that can be useful in training the machine learning model to rank user-related metrics. Examples of features associated with a page administrator can include experience level of a page administrator (e.g., new, experienced, etc.), capabilities or roles (e.g., full admin, editor, moderator, advertiser, analyst, etc.), history or pattern of a page administrator (e.g., does a page administrator prefer to review messages more than shares), etc. Examples of features associated with a page can include a category of a page, a number of fans of a page, an age of a page, a level of user activity, etc. Many variations are possible. Features can be selected as appropriate to train the machine learning model. The machine learning model can be retrained based on new or updated training data. For example, if information about new user-related metrics that page administrators have engaged with becomes available, the user metric training module 204 can train the machine learning model based on the information about the new user-related metrics. The user metric training module 204 can refine the machine learning model in order to achieve desired ranking results, for example, by retraining the machine learning model, adjusting features included in the machine learning model, etc. The user metric training module 204 can also train or retrain the machine learning model based on feedback provided by page administrators relating to page update content items and/or pages, as described herein.

The user metric evaluation module 206 can apply a trained machine learning model to user-related metrics to rank the user-related metrics according to a likelihood of page administrators engaging with the user-related metrics. For example, the user metric evaluation module 206 can rank user-related metrics for a page based on a likelihood of a page administrator of the page engaging with the user-related metrics. However, certain user-related metrics may not be applicable for a particular page. For example, a metric relating to messages is not helpful for a page administrator if a page associated with the page administrator does not have any messages. Accordingly, prior to applying the trained machine learning model to rank user-related metrics, the user metric evaluation module 206 can determine whether eligibility criteria relating to a particular user-related metric is satisfied. Eligibility criteria can indicate one or more conditions that should be satisfied for a user metric to be applicable for a page. For example, for the metric relating to messages, the eligibility criteria can be the count associated with messages. If the count of messages of a page is zero, the metric relating to messages is not included as a potential user-related metric for the page and therefore not ranked. The user metric evaluation module 206 can rank user-related metrics that satisfy eligibility criteria in the context of a particular page. The trained machine learning model can determine a score for each eligible user-related metric for a page. Eligible user-related metrics can be ordered according to the scores, and the top user-related metrics can be selected as candidates to include for the page.

The number of user-related metrics selected as candidates can depend on the maximum number of slots for user-related metrics in a card. In some cases, the number of available or ranked user-related metrics may be less than the maximum number of slots for user-related metrics in a card. In such cases, additional recommendations can be provided, for example, by the recommendation ranking module 222 in place of user-related metrics. The number of user-related metrics and/or recommendations included in a card can be adjusted as appropriate. All examples herein are provided for illustrative purposes, and there can be many variations and other possibilities.

Figure 2B:
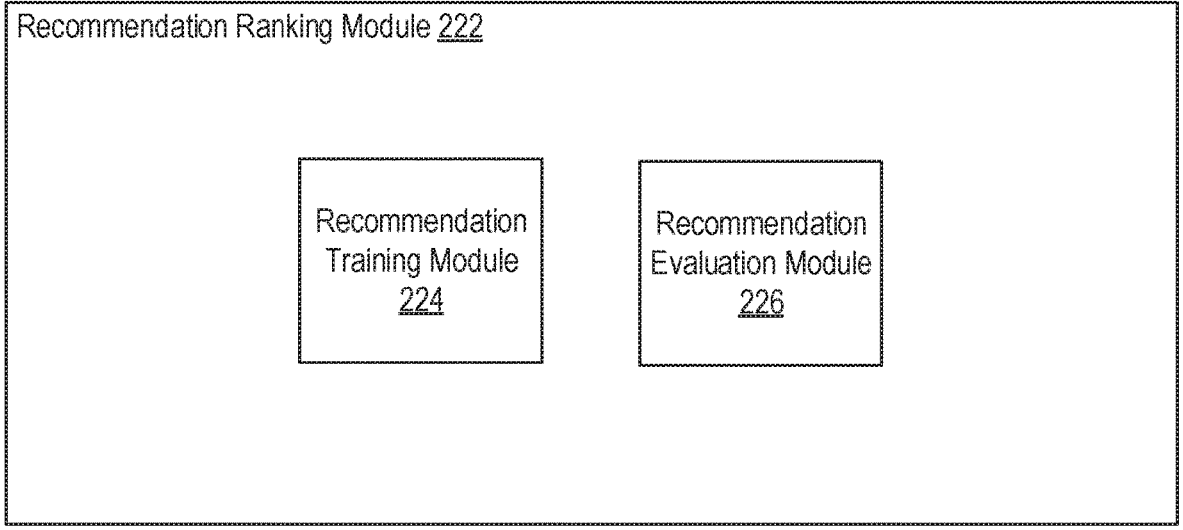
FIG. 2B illustrates an example recommendation ranking module configured to rank recommendations associated with a page, according to an embodiment of the present disclosure.

FIG. 2B illustrates an example recommendation ranking module 222 configured to rank recommendations associated with a page, according to an embodiment of the present disclosure. In some embodiments, the recommendation ranking module 106 of FIG. 1 can be implemented with the recommendation ranking module 222. As shown in the example of FIG. 2B, the recommendation ranking module 222 can include a recommendation training module 224 and a recommendation evaluation module 226.

The recommendation ranking module 222 can rank recommendations for a page according to a likelihood or probability of page administrators engaging with the recommendations. For example, a page administrator can engage with a recommendation by selecting the recommendation when it appears in a card in a page update content item. A page administrator can engage with a recommendation in different ways, and many variations are possible. Examples of recommendations can include suggestions to invite connections to like a page, suggestions to add an administrator to a page, suggestions to add a profile photo for a page, suggestions to add a cover photo for a page, suggestions to promote a post, etc. There can be other types of recommendations, and many variations are possible. The recommendations can be ranked based on a machine learning model.

The recommendation training module 224 can train a machine learning model based on training data relating to recommendations. Training data can indicate recommendations that page administrators have engaged with and slots within a card in which the recommendations were displayed. Recommendations that page administrators have engaged with in cards can be tracked, as explained above. Tracked information about recommendations that page administrators have engaged with can be included in the training data. Various features can be used in training the machine learning model. As described above, features can include features associated with a page administrator, features associated with a page, or any other features that can be useful in training the machine learning model to rank recommendations. Features can be selected as appropriate to train the machine learning model. The machine learning model can be retrained based on new or updated training data. For example, if information about new recommendations that page administrators have engaged with becomes available, the recommendation training module 224 can train the machine learning model based on the information about the new recommendations. The recommendation training module 224 can refine the machine learning model in order to achieve desired ranking results, for example, by retraining the machine learning model, adjusting features included in the machine learning model, etc. The recommendation training module 224 can also train or retrain the machine learning model based on feedback provided by page administrators relating to page update content items and/or pages, as described herein.

The recommendation evaluation module 226 can apply a trained machine learning model to recommendations to rank the recommendations according to a likelihood of page administrators engaging with the recommendations. For example, the recommendation evaluation module 226 can rank recommendations for a page based on a likelihood of a page administrator of the page engaging with the recommendations. Similar to user-related metrics, the recommendation evaluation module 226 can determine whether eligibility criteria relating to a particular recommendation is satisfied. Eligibility criteria can indicate one or more conditions that should be satisfied for a recommendation to be applicable for a page. For example, for the recommendation relating to a suggestion to add a profile photo, the recommendation evaluation module 226 can check whether a page has a profile photo. If a page already has a profile photo, the recommendation for adding a profile photo is not included as a potential recommendation for the page and therefore not ranked. The recommendation evaluation module 226 can rank recommendations that satisfy eligibility criteria in the context of a particular page. The trained machine learning model can determine a score for each eligible recommendation for a page. Eligible recommendations can be ordered according to the scores, and the top recommendations can be selected as candidates to include for the page. The number of recommendations selected as candidates can depend on the maximum number of slots for recommendations in a card. In some cases, the number of ranked recommendations may be less than the maximum number of slots for recommendations in a card. In such cases, the recommendation evaluation module 226 can provide one or more default recommendations. All examples herein are provided for illustrative purposes, and there can be many variations and other possibilities.

Figure 2C:
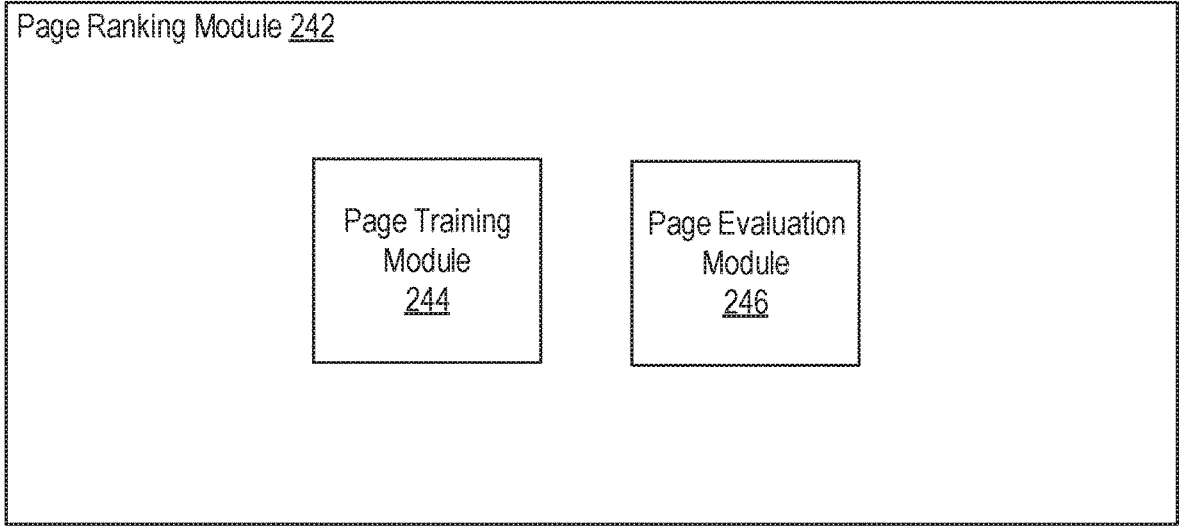
FIG. 2C illustrates an example page ranking module configured to rank pages associated with an administrator, according to an embodiment of the present disclosure.

FIG. 2C illustrates an example page ranking module 242 configured to rank pages associated with an administrator, according to an embodiment of the present disclosure. In some embodiments, the page ranking module 108 of FIG. 1 can be implemented with the page ranking module 242. As shown in the example of FIG. 2C, the page ranking module 242 can include a page training module 244 and a page evaluation module 246.

The page ranking module 242 can rank pages according to a likelihood or probability of page administrators engaging with cards for the pages. For example, a page administrator can engage with a card for a page by selecting the card when the card appears in a page update content item. A page administrator can engage with a card for a page in different ways, and many variations are possible. The pages can be ranked based on a machine learning model. A page can be ranked based on user-related metrics that are determined by the user metric ranking module 204 as candidate user-related metrics for the page and recommendations that are determined by the recommendation ranking module 222 of FIG. 2B as candidate recommendations for the page. Particular combinations and orders of user-related metrics and recommendations included for a page can affect a likelihood of page administrators engaging with the card for the page. User-related metrics and recommendations for a page can provide helpful or relevant information for a page administrator in managing the page.

The page training module 244 can train a machine learning model based on training data relating to pages. Training data can indicate cards for pages with which page administrators have engaged. Cards for pages that page administrators have engaged with can be tracked as well as user-related metrics and recommendations included in the cards for such pages. Tracked information about cards for pages that page administrators have engaged with, and user-related metrics and recommendations included in the cards for such pages can be included in the training data. Various features can be used in training the machine learning model. As described above, features can include features associated with a page administrator, features associated with a page, or any other features that can be useful in training the machine learning model to rank pages. Features can be selected as appropriate to train the machine learning model. The machine learning model can be retrained based on new or updated training data. For example, if information about new pages that page administrators have engaged with becomes available, the page training module 244 can train the machine learning model based on the information about the new pages. The page training module 244 can refine the machine learning model in order to achieve desired ranking results, for example, by retraining the machine learning model, adjusting features included in the machine learning model, etc. The page training module 244 can also train or retrain the machine learning model based on feedback provided by page administrators relating to page update content items and/or pages. In some embodiments, a dedicated machine learning model can be used in relation to each of the user metric ranking module 202, the recommendation ranking module 222, and the page ranking module 242, In such embodiments, three separate machine learning models can be used. In some embodiments, any other suitable number of machine learning models can be used in accordance with the present technology. For example, one machine learning model can be used to determine ranked user-related metrics, recommendations, and pages.

The page evaluation module 246 can apply a trained machine learning model to pages to rank the pages according to a likelihood of page administrators engaging with cards for the pages. As explained above, a page can be ranked based on user-related metrics that are determined by the user metric ranking module 202 of FIG. 2A as candidate user-related metrics for the page and recommendations that are determined by the recommendation ranking module 222 of FIG. 2B as candidate recommendations for the page. The page evaluation module 246 can determine whether eligibility criteria relating to a particular page is satisfied. Eligibility criteria can indicate one or more conditions that should be satisfied for a page to be a candidate to address in a page update content item. For example, in certain cases, a page administrator may not be eligible to see a page in a page update content item in the page administrator's feed, depending on a role of the page administrator for the page. Certain roles, such as advertiser and analyst, may not have access to certain functionalities associated with the page. If user-related metrics and recommendations selected for a page are not accessible for the role of the page administrator, a card for the page may not be included as a candidate in the page update content item. The page evaluation module 246 can rank pages that satisfy eligibility criteria. The trained machine learning model can determine a score for each eligible page that indicates a likelihood of engagement the page administrator. Eligible pages can be ordered according to the scores, and the top pages can be selected as candidates to address in a page update content item for a page administrator. The number of pages selected as candidates can depend on the maximum number of cards in a page update content item. All examples herein are provided for illustrative purposes, and there can be many variations and other possibilities.

Figure 3A:
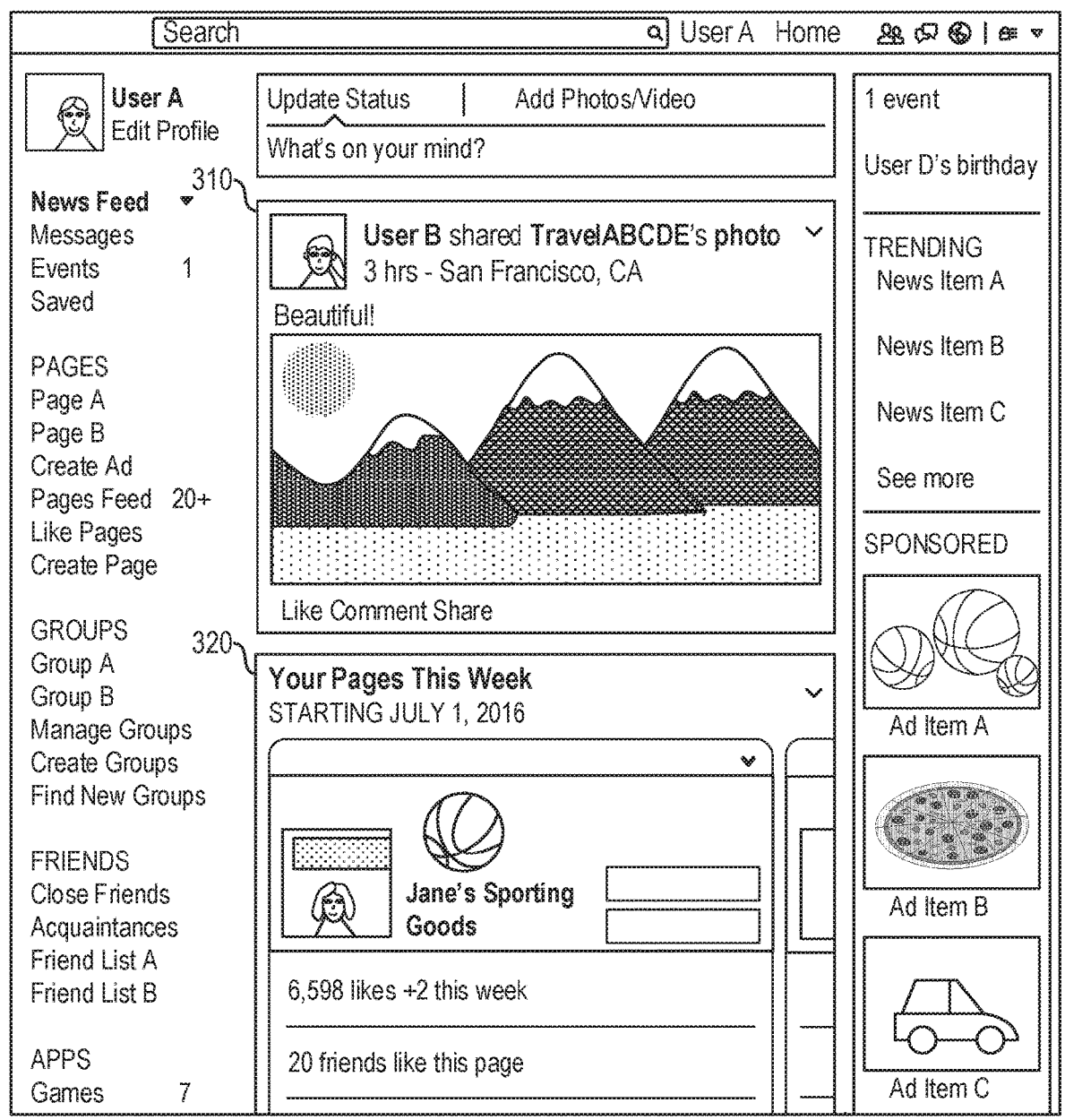
FIG. 3A illustrates an example user interface for providing page updates in feeds of administrators, according to an embodiment of the present disclosure.

FIG. 3A illustrates an example user interface 300 for providing page updates in feeds of administrators, according to an embodiment of the present disclosure. The user interface 300 displays a feed of a page administrator. The feed of the page administrator can include content items. In the example of FIG. 3A, the page administrator's feed includes a first content item 310 and a second content item 320, which is a page update content item. The page update content item 320 is shown in more detail in FIGS. 3B and 3C.

Figure 3B:
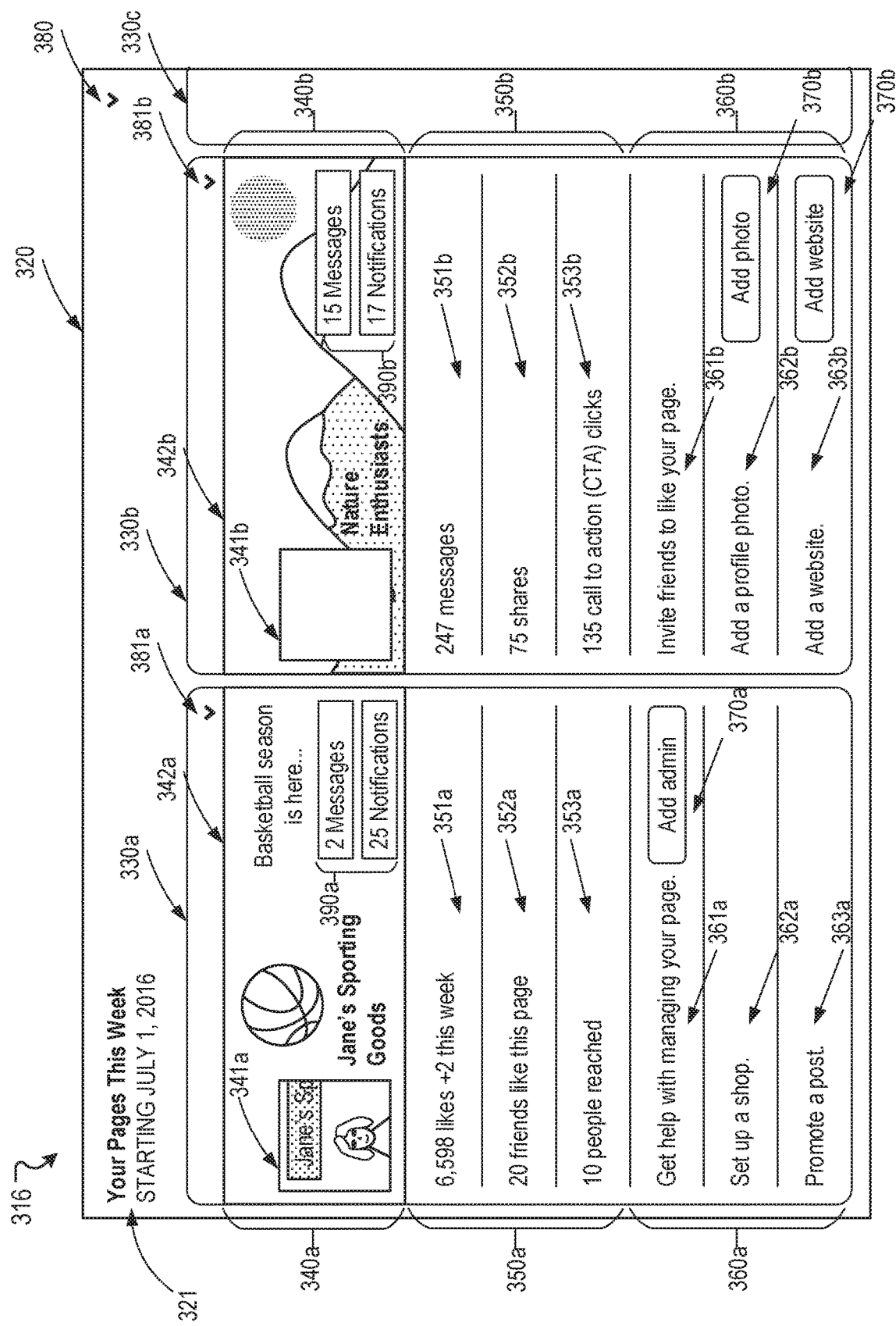
FIG. 3B illustrates an example page update content item for providing page updates in feeds of administrators, according to an embodiment of the present disclosure.

FIG. 3B illustrates an example user interface 316 reflecting the page update content item 320 for providing page updates in feeds of administrators, according to an embodiment of the present disclosure. The page update content item 320 can be a page update content item included in a page administrator's feed. The page update content item 320 can indicate a time period 321 associated with the page update content item. For example, in the example of FIG. 3B, the page update content item 320 is for a period of one week. In the example of FIG. 3B, the page update content item 320 includes a first card 330a for a first page, a second card 330b for a second page, and a third card 330c listing unselected pages and corresponding unread counts. The first card 330a and the second card 330b are shown in detail in FIG. 3B. The third card 330c is shown in detail in FIG. 3C.

Each card 330a, 330b can include a respective presence information section 340a, 340b, a respective user-related metrics section 350a, 350b, and a respective recommendation section 360a, 360b. Each presence information section 340a, 340b can include a respective profile photo 341a, 341b and a respective cover photo 342a, 342b. In some cases, each unread counts 390a, 390b can be displayed in the respective presence information section 340a, 340b. Each user-related metrics section 350a, 350b can display one or more user-related metrics. In the example of FIG. 3B, three user-related metrics, as an example, are displayed for each page. The first card 330a has three slots or rows for user-related metrics 351a, 352a, 353a, and selected user-related metrics are displayed in the three slots in a ranked order. The second card 330b has three slots or rows for user-related metrics 351b, 352b, 353b, and selected user-related metrics are displayed in the three slots in a ranked order. For example, the ranked order can be an order in which the user-related metrics were ranked by the user metric ranking module 202. The recommendation section 360a, 360b can display one or more recommendations. In the example of FIG. 3B, three recommendations, as an example, are displayed for each page. The first card 330a has three slots or rows for recommendations 361a, 362a, 363a, and selected recommendations are displayed in the three slots in a ranked order. The second card 330b has three slots or rows for recommendations 361b, 362b, 363b, and selected recommendations are displayed in the three slots in a ranked order. For example, the ranked order can be an order in which the recommendations were ranked by the recommendation ranking module 222. Some recommendations can have action buttons 370a, 370b associated with them. For example, the recommendation in the first recommendation slot 361a of the first card 330a is "get help with managing your page," and the action button 370a associated with the recommendation is "add admin."

Figure 3C:
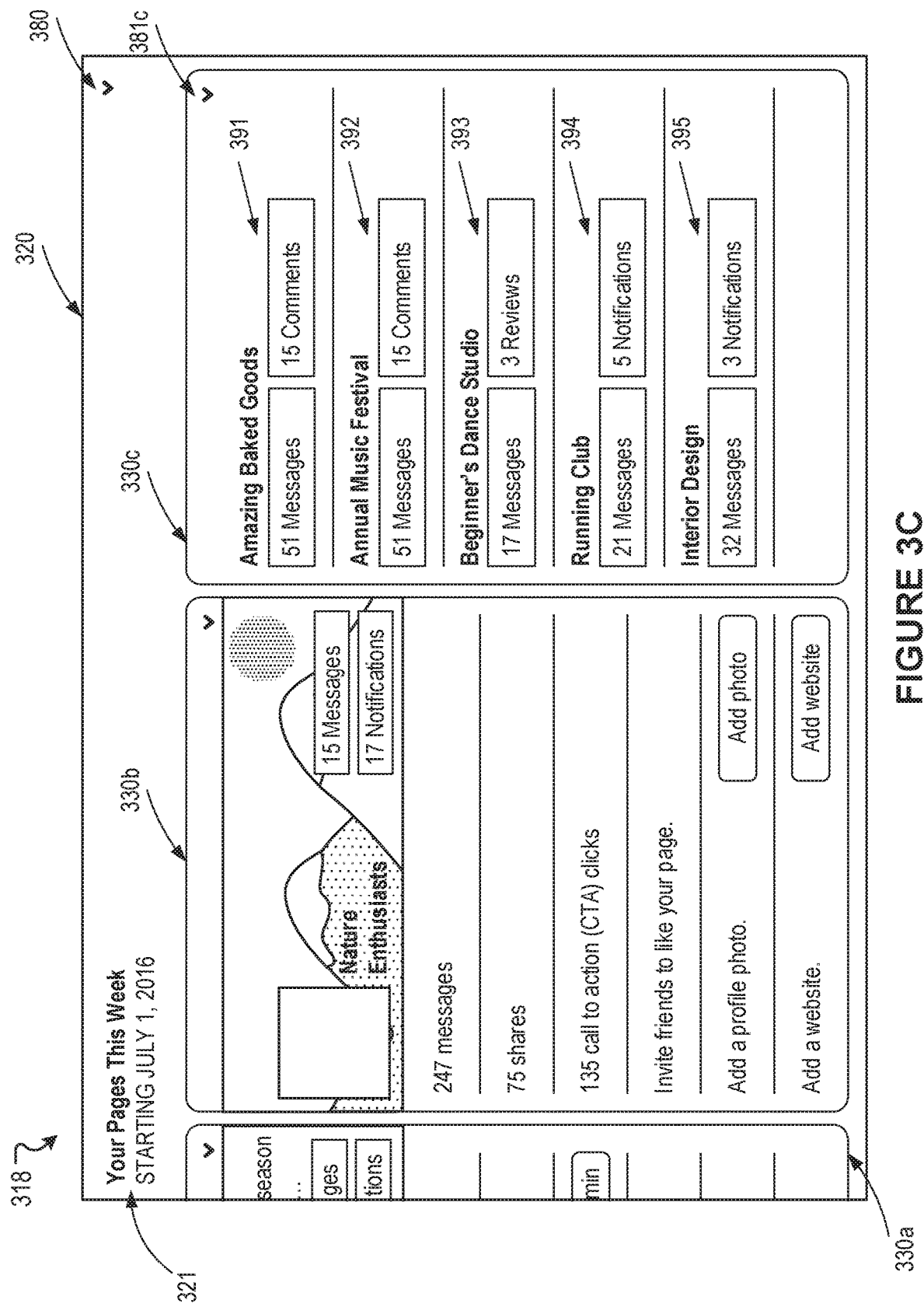
FIG. 3C illustrates an example page update content item for providing page updates in feeds of administrators, according to an embodiment of the present disclosure.

As mentioned above, the page administrator can provide feedback regarding whether the page administrator wants to see more or less of certain information in the page update content item 320. The feedback can be provided for each page or for the entire page update content item. For example, the page administrator can select a feedback indicator associated with the page update content item or a feedback indicator associated with a page. In the examples of FIGS. 3A-3C, the feedback indicator is provided as a caret. For example, the page administrator can select a caret 380 for the page update content item to provide feedback regarding whether the page administrator wants to see more or less of the page update content item 320. The page administrator can also select a caret 381a, 381b for each card to provide feedback regarding whether the page administrator wants to see more or less of cards like the card for the page.

FIG. 3C illustrates an example user interface 318 reflecting the page update content item 320 for providing page updates in feeds of administrators, according to an embodiment of the present disclosure. The page update content item 320 is the same as the page update content item 320 in FIG. 3B, but scrolled to the right to show the third card 330c in the page update content item 320. If not all cards included in the page update content item 320 can be shown at the same time, the page administrator can view the cards by scrolling, for example, from left to right. FIG. 3C shows the third card 330c listing unselected pages and corresponding unread counts, which can be referred to as a "page summary card." The third card 330c can list one or more pages that have not been selected for representation in a dedicated card, for example, by the page ranking module 242, but that have unread counts about which the page administrator may want to know. The third card 330c can have one or more slots or rows for such unselected pages. In the example of FIG. 3C, the third card 330c displays five pages in five slots 391, 392, 393, 394, 395. For each unselected page, the third card 330c can list the name of the page and unread counts associated with the page. As mentioned above, unread counts can be number of unread items, such as messages, comments, notifications, reviews, etc. The page administrator can select a caret 381c for the third card 330c to provide feedback regarding whether the page administrator wants to see more or less of the information in the third card 330c.

The page administrator can engage with information displayed in the page update content item 320, such as cards, user-related metric slots, recommendation slots, etc. As explained above, the items that the page administrator engages with can be tracked, for example, in order to train machine learning models. When the page administrator engages with a particular card or a particular section of a card, the user interface 300, 316, 318 can display a page associated with the particular card or a relevant section of the page. For example, if the page administrator selects a user-related metric in a card for a page, and the user interface 300, 316, 318 can display a section of the page relating to the user-related metric. Pages addressed in a page update content item can be ranked and selected such that a page administrator would be likely to engage with the pages.

FIGS. 3A-3C are provided for illustrative purposes, and page updates can be displayed in any suitable manner. In some embodiments, a sequence of cards for pages can be displayed vertically. In some embodiments, information about pages can be represented in a format different from cards.

FIG. 4 illustrates an example first method 400 for providing page updates in feeds of administrators, according to an embodiment of the present disclosure. It should be understood that there can be additional, fewer, or alternative steps performed in similar or alternative orders, or in parallel, based on the various features and embodiments discussed herein unless otherwise stated.

At block 402, the example method 400 can determine one or more user-related metrics relating to each page of a plurality of pages associated with an administrator based on a first machine learning model. At block 404, the example method 400 can determine one or more recommendations relating to each page of the plurality of pages based on a second machine learning model. At block 406, the example method 400 can determine one or more pages of the plurality of pages for which to display cards including page updates in a feed of the administrator, based on the determined user-related metrics and the determined recommendations. Other suitable techniques that incorporate various features and embodiments of the present disclosure are possible.

Figure 5:
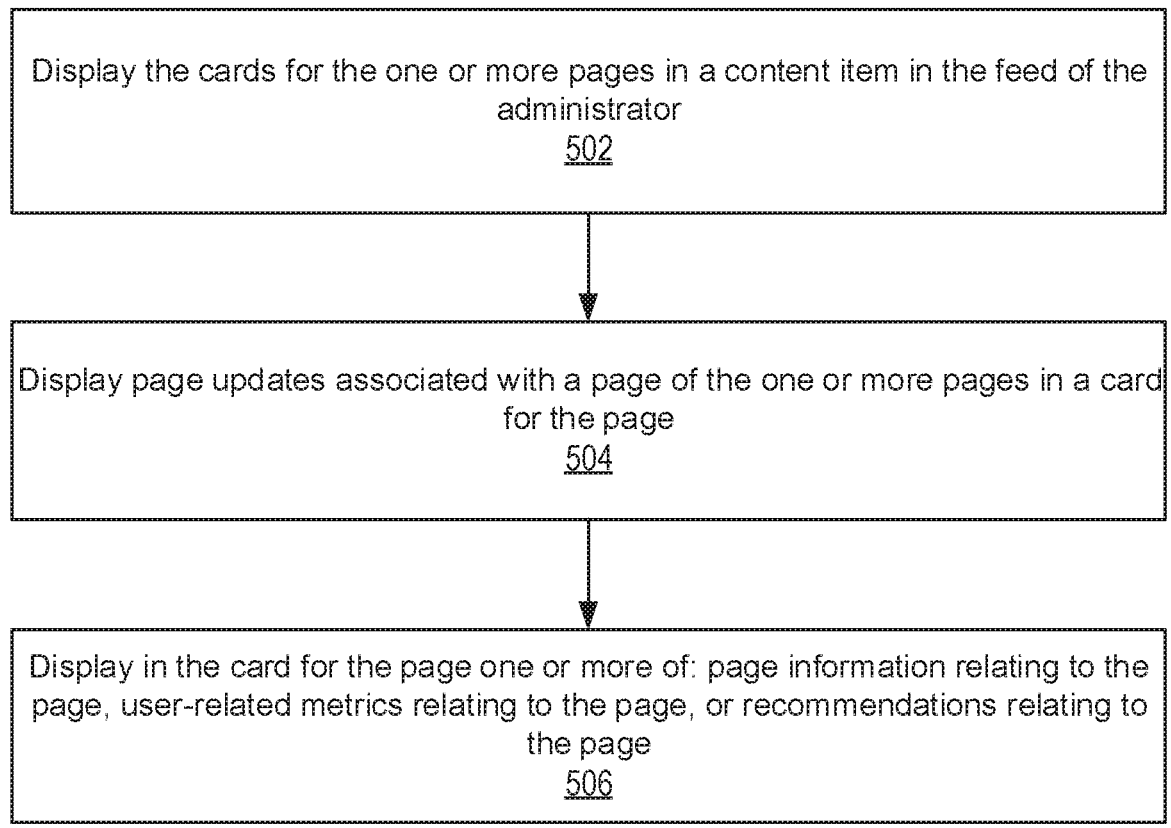
FIG. 5 illustrates an example second method for providing page updates in feeds of administrators, according to an embodiment of the present disclosure.

FIG. 5 illustrates an example second method 500 for providing page updates in feeds of administrators, according to an embodiment of the present disclosure. It should be understood that there can be additional, fewer, or alternative steps performed in similar or alternative orders, or in parallel, based on the various features and embodiments discussed herein unless otherwise stated. Certain steps of the method 500 may be performed in combination with the example method 400 explained above.

At block 502, the example method 500 can display the cards for the one or more pages in a content item in the feed of the administrator. The cards for the one or more pages can be similar to the cards for the one or more pages explained in connection with FIG. 4. At block 504, the example method 500 can display page updates associated with a page of the one or more pages in a card for the page. At block 506, the example method 500 can display in the card for the page one or more of: page information relating to the page, user-related metrics relating to the page, or recommendations relating to the page. Other suitable techniques that incorporate various features and embodiments of the present disclosure are possible.

It is contemplated that there can be many other uses, applications, features, possibilities, and/or variations associated with various embodiments of the present disclosure. For example, users can, in some cases, choose whether or not to opt-in to utilize the disclosed technology. The disclosed technology can, for instance, also ensure that various privacy settings, preferences, and configurations are maintained and can prevent private information from being divulged. In another example, various embodiments of the present disclosure can learn, improve, and/or be refined over time.

Social Networking System—Example Implementation

Figure 6:
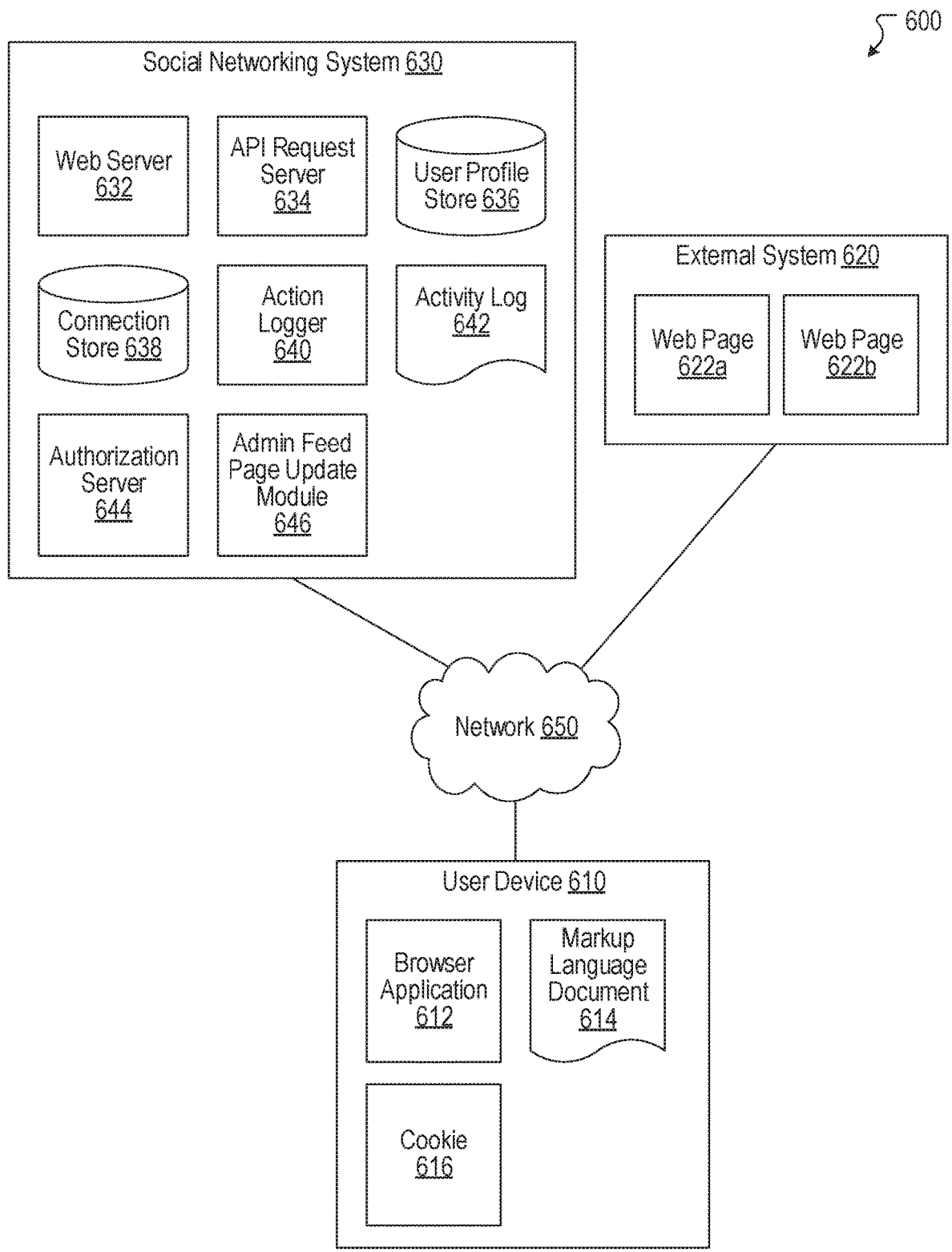
FIG. 6 illustrates a network diagram of an example system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and Short Message Service (SMS) messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include an admin feed page update module 646. The admin feed page update module 646 can be implemented with the admin feed page update module 102, as discussed in more detail herein. In some embodiments, one or more functionalities of the admin feed page update module 646 can be implemented in the user device 610.

Hardware Implementation

Figure 7:
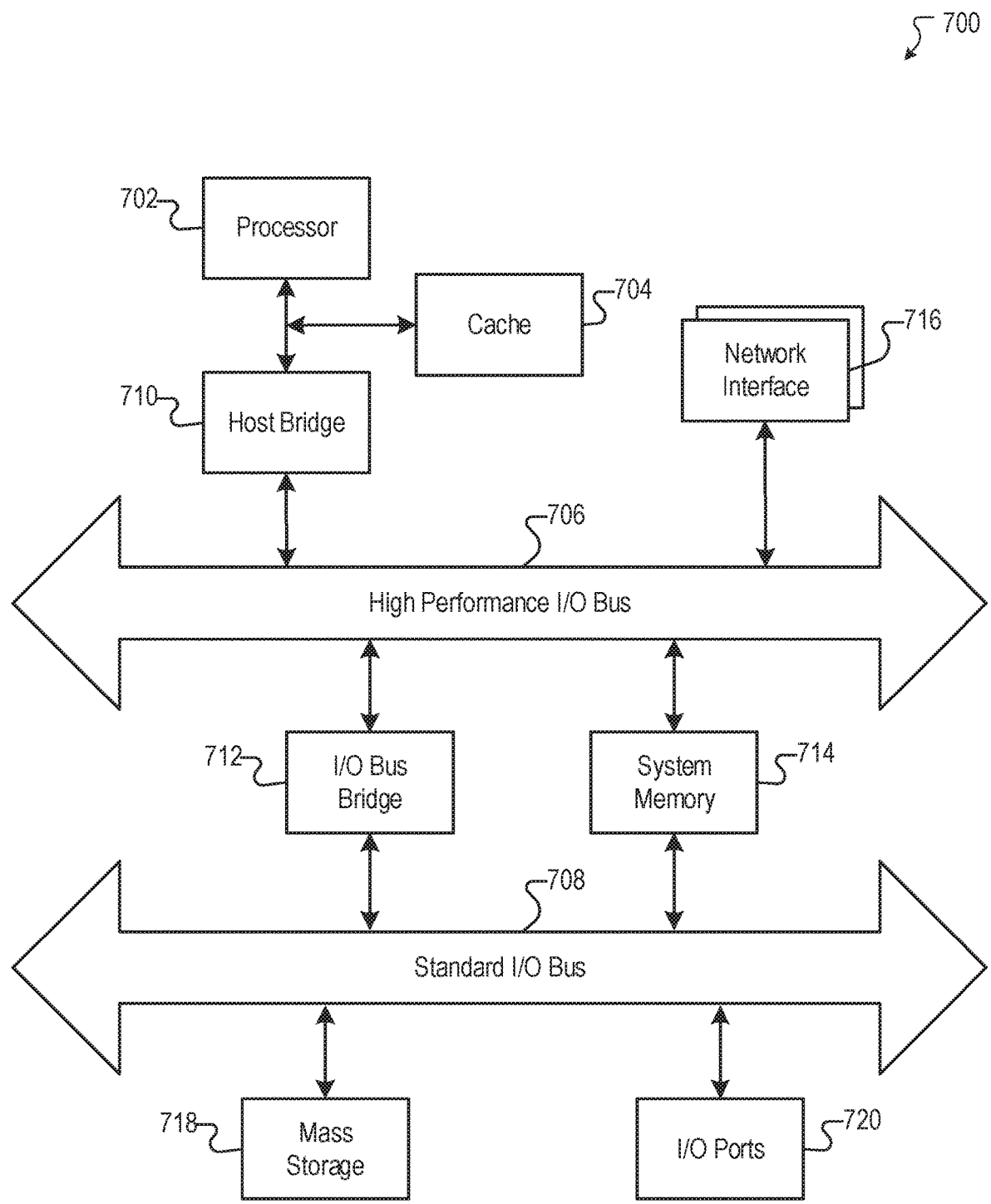
FIG. 7 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A computer-implemented method comprising:
   determining, by a computing system, one or more user-related metrics related to a plurality of pages associated with an administrator based at least in part on a likelihood of the administrator selecting the one or more user-related metrics, wherein the likelihood of the administrator selecting the one or more user-related metrics is determined by a first machine learning model and the first machine learning model is trained based at least in part on tracked information about user-related metrics and pages with which page administrators have engaged;
   determining, by the computing system, one or more recommendations related to the plurality of pages based at least in part on a likelihood of the administrator selecting the one or more recommendations and a number of determined user-related metrics, wherein the likelihood of the administrator selecting the one or more recommendations is determined by a second machine learning model and the second machine learning model is trained based at least in part on the tracked information about user-related metrics and page recommendations selected by the page administrators; and
   determining, by the computing system, one or more pages of the plurality of pages for which to provide one or more cards of page updates for the administrator, based at least in part on the determined user-related metrics and the determined recommendations; and
   providing, by the computing system, a content item that includes the one or more cards, wherein the one or more cards include the determined user-related metrics and the determined recommendations for the one or more pages corresponding to the one or more cards and wherein a selection of at least one of: the one or more cards, the determined user-related metrics, or the determined recommendations is included in new training data for further training at least one of: the first machine learning model or the second machine learning model.

2. The computer-implemented method of claim 1, further comprising providing the content item in a feed associated with the administrator.

3. The computer-implemented method of claim 2, wherein the one or more cards include page updates associated with the one or more pages corresponding to the one or more cards.

4. The computer-implemented method of claim 3, wherein the one or more cards further include at least one of: page information relating to the one or more pages corresponding to the one or more cards, user-related metrics relating to the one or more pages corresponding to the one or more cards, or recommendations relating to the one or more pages corresponding to the one or more cards.

5. The computer-implemented method of claim 4, further comprising obtaining feedback associated with at least one of: the one or more cards, the determined user-related metrics, or the determined recommendations.

6. The computer-implemented method of claim 3, wherein the content item includes an additional card that provides a list including at least one page not included in the one or more pages and a number of unread items associated with the at least one page.

7. The computer-implemented method of claim 1, wherein the new training data further include slots within the one or more cards in which the determined user-related metrics are provided.

8. The computer-implemented method of claim 1, wherein the new training data further include feedback obtained from the administrator regarding whether the administrator prefers to see more or less of certain types of information included in the content item.

9. The computer-implemented method of claim 1, wherein the determining one or more pages of the plurality of pages for which to provide one or more cards of page updates for the administrator is based on a third machine learning model.

10. The computer-implemented method of claim 1, wherein the determined user-related metrics satisfy eligibility criteria.

11. A system comprising:
    at least one hardware processor; and
    a memory storing instructions that, when executed by the at least one processor, cause the system to perform:
       determining one or more user-related metrics related to of a plurality of pages associated with an administrator based at least in part on a likelihood of the administrator selecting the one or more user-related metrics, wherein the likelihood of the administrator selecting the one or more user-related metrics is determined by a first machine learning model and the first machine learning model is trained based at least in part on tracked information about user-related metrics and pages with which page administrators have engaged;
       determining one or more recommendations related to the plurality of pages based at least in part on a likelihood of the administrator selecting the one or more recommendations and a number of determined user-related metrics, wherein the likelihood of the administrator selecting the one or more recommendations is determined by a second machine learning model and the second machine learning model is trained based at least in part on the tracked information about user-related metrics and page recommendations selected by the page administrators; and determining one or more pages of the plurality of pages for which to provide one or more cards of page updates for the administrator, based at least in part on the determined user-related metrics and the determined recommendations; and providing a content item that includes the one or more cards, wherein the one or more cards include the determined user-related metrics and the determined recommendations for the one or more pages corresponding to the one or more cards and wherein a selection of at least one of: the one or more cards, the determined user-related metrics, or the determined recommendations is included in new training data for further training at least one of: the first machine learning model or the second machine learning model.

12. The system of claim 11, wherein the instructions further cause the system to perform providing the content item in a feed associated with the administrator.

13. The system of claim 12, wherein the one or more cards include page updates associated with the one or more pages corresponding to the one or more cards.

14. The system of claim 13, wherein the one or more cards further include at least one of: page information relating to the one or more pages corresponding to the one or more cards, user-related metrics relating to the one or more pages corresponding to the one or more cards, or recommendations relating to the one or more pages corresponding to the one or more cards.

15. The system of claim 11, wherein the determining one or more pages of the plurality of pages for which to provide one or more cards of page updates for the administrator is based on a third machine learning model.

16. A non-transitory computer readable medium including instructions that, when executed by at least one hardware processor of a computing system, cause the computing system to perform a method comprising:

determining one or more user-related metrics related to a plurality of pages associated with an administrator based at least in part on a likelihood of the administrator selecting the one or more user-related metrics, wherein the likelihood of the administrator selecting the one or more user-related metrics is determined by a first machine learning model and the first machine learning model is trained based at least in part on tracked information about user-related metrics and pages with which page administrators have engaged;

determining one or more recommendations related to the plurality of pages based at least in part on a likelihood of the administrator selecting the one or more recommendations and a number of determined user-related metrics, wherein the likelihood of the administrator selecting the one or more recommendations is determined by a second machine learning model and the second machine learning model is trained based at least in part on the tracked information about user-related metrics and page recommendations selected by the page administrators; and determining one or more pages of the plurality of pages for which to provide one or more cards of page updates for the administrator, based at least in part on the determined user-related metrics and the determined recommendations; and providing a content item that includes the one or more cards, wherein the one or more cards include the determined user-related metrics and the determined recommendations for the one or more pages corresponding to the one or more cards and wherein a selection of at least one of: the one or more cards, the determined user-related metrics, or the determined recommendations is included in new training data for further training at least one of: the first machine learning model or the second machine learning model.

17. The non-transitory computer readable medium of claim 16, wherein the method further comprises providing the content item in a feed associated with the administrator.

18. The non-transitory computer readable medium of claim 17, wherein the one or more cards include page updates associated with the one or more pages corresponding to the one or more cards.

19. The non-transitory computer readable medium of claim 18, wherein the one or more cards further include at least one of: page information relating to the one or more pages corresponding to the one or more cards, user-related metrics relating to the one or more pages corresponding to the one or more cards, or recommendations relating to the one or more pages corresponding to the one or more cards.

20. The non-transitory computer readable medium of claim 16, wherein the determining one or more pages of the plurality of pages for which to provide one or more cards of page updates for the administrator is based on a third machine learning model.

* * * * *